United States Patent [19]

Parsons et al.

[11] 4,288,126
[45] Sep. 8, 1981

[54] AIR ASSISTED BRAKING SYSTEM

[75] Inventors: David Parsons, Kenilworth; Harold Hodkinson, Finham, both of England

[73] Assignee: Automotive Products Limited, Warwickshire, England

[21] Appl. No.: 68,535

[22] Filed: Aug. 22, 1979

[30] Foreign Application Priority Data

Sep. 1, 1978 [GB] United Kingdom ............... 35259/78

[51] Int. Cl.³ ................................................. B60T 8/26
[52] U.S. Cl. .................................... 303/6 C; 303/22 R
[58] Field of Search ..................... 303/2, 6 C, 6 M, 40, 303/61, 22 R; 188/349

[56] References Cited

U.S. PATENT DOCUMENTS 3,155,435 11/1964 Nicolay et al. ......................... 303/40
3,227,494 1/1966 Alfieri .................................... 303/40
3,503,657 3/1970 MacDuff ......................... 303/6 C X
3,547,498 12/1970 Bueler ................................. 303/6 C
3,672,728 6/1972 Keady et al. ....................... 303/6 C

FOREIGN PATENT DOCUMENTS 1195126 6/1970 United Kingdom ............... 303/6 C

Primary Examiner—Duane A. Reger
Attorney, Agent, or Firm—Kemon & Estabrook

[57] ABSTRACT

This invention relates to an air powered braking system for a vehicle. The air pressure in the front and rear brake systems is regulated by a respective one of a pair of air pressure valves. The air valves are hydraulically controlled and each valve (16) and (26) is independently connected to a driver operable hydraulic master cylinder so that the air pressure in each of the front or rear systems is proportional to the hydraulic pressure generated at the master cylinder (11). A hydraulic reducing valve is interposed in the hydraulic circuit between the master cylinder and the rear brake system air valve and operation of the reducing valve reduces the hydraulic pressure to that air valve and hence reduces the air pressure to the rear brakes relative to the air pressure to the front brakes.

4 Claims, 3 Drawing Figures

AIR ASSISTED BRAKING SYSTEM

This invention relates to an air powered braking system for vehicles and in particular to those systems in which the front brake sets are applied with a greater force than the rear sets.

Commercial vehicles having air powered braking systems are commonly fitted with air pressure reducing valves which are placed in the brake system to the rear brakes of the vehicle. This is so that during application of the brakes after the air pressure in the rear brakes has reached a predetermined limit then the rate of increase in air pressure to the rear brakes is less than the rate of increase in air pressure to the front brakes. Air pressure reducing valves tend to be bulky and complicated items which are expensive to manufacture.

The object of the present invention is to provide an alternative method of reducing the air pressure to the rear braking system relative to the air pressure to the front braking system of a vehicle.

Accordingly there is provided an air powered braking system for vehicles, said system having a driver operable hydraulic master cylinder separately connected to each of a pair of hydraulically controlled air pressure valves, each of which regulate the air pressure in their respective one of the front or rear air powered brake systems such that the air pressure in each of the front and rear systems is proportional to the hydraulic pressure acting in the air valves and generated by the master cylinder, wherein a hydraulic pressure reducing valve is interposed in the hydraulic circuit between the master cylinder and the rear brake air valve.

The invention will be described by way of example and with reference to the accompanying drawings in which.

Figure 1:
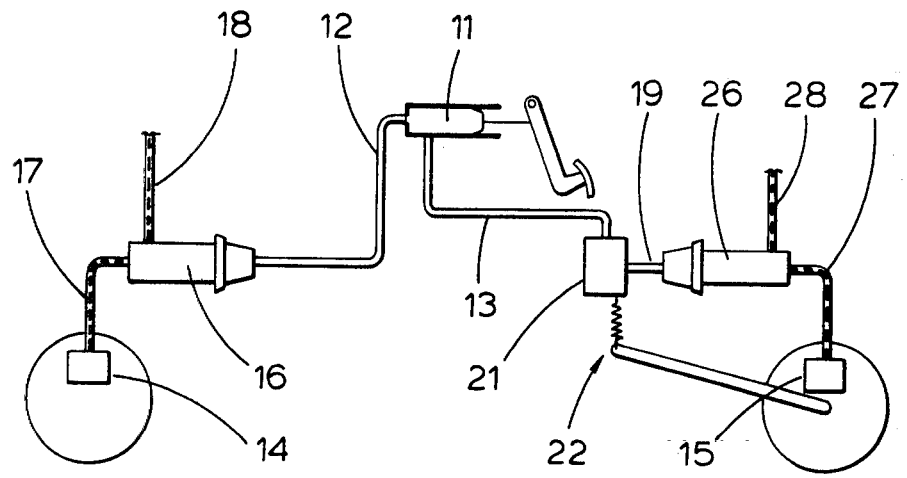
FIG. 1 is a schematic portion of one brake system according to this invention.

With reference to FIG. 1, a hydraulic master cylinder 11 is connected via two separate hydraulic pipes 12 and 13 to the front and rear wheel braking sets, 14 and 15 respectively, of a vehicle. The first hydraulic pipe 12 connects the master cylinder 11 to a hydraulically controlled air valve 16 which regulates the air pressure in its respective air braking system so that the air pressure in the air braking system is proportional to the hydraulic pressure in the pipe 12. The air valve 16 is connected by air pipes 17 to the air operated front brake sets 14 and by another air pipe 18 to a source of air pressure.

The second hydraulic pipe 13 is also connected to a hydraulically controlled air valve 26 which works in the manner as described above for valve 16, so that the air pressure in the rear brakes 15 is proportional to the hydraulic pressure in its hydraulic input pipe 19. The air valve 26 is connected by air pipe 27 to the air operated rear brake set 15 and by another air pipe 28 to a source of air pressure. A hydraulic load sensitive pressure reducing valve 21 is placed in the hydraulic line connecting the master cylinder 11 to the air control valve 26 for the rear brake sets 15.

The load sensitive reducing valve 21 is connected in the usual manner through a system of springs and levers, indicated generally at 22, to the rear axle of the vehicle to sense the changes in height between the spring and unsprung portions of the vehicle as the load on the vehicle suspension changes.

The load sensitive reducing valve 21, works in a manner which is well known in the art, to ensure that after a predetermined hydraulic pressure has been reached, that the rate of increase in pressure in the pipe 19 to the rear brakes will be less than the rate of increase in pressure generated in the master cylinder 11 and the pressure in the pipe 12 to the front brakes. Therefore, since the air braking pressure is proportional to the hydraulic pressure in the air valves 16 and 26 then the air pressure applied to the rear brake sets 15 will be less than that applied to the front brake sets 14.

Figure 2:
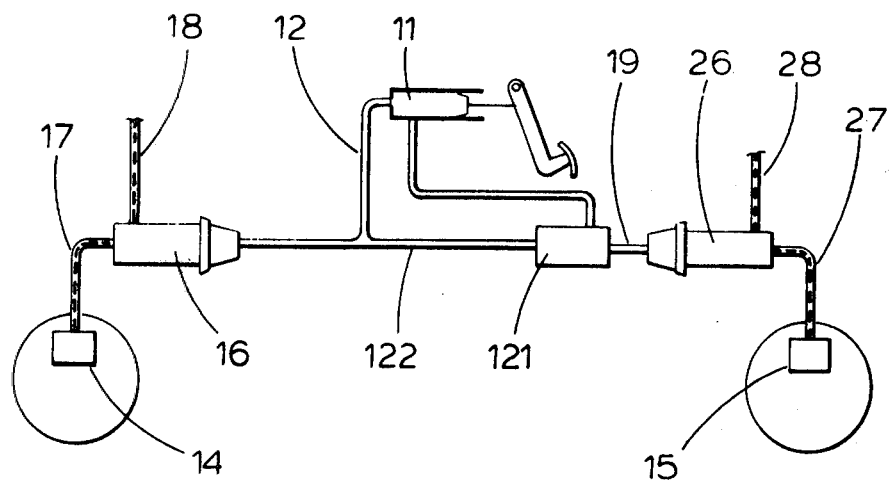
FIG. 2 is a schematic portion of a second brake system according to this invention.
Figure 3:
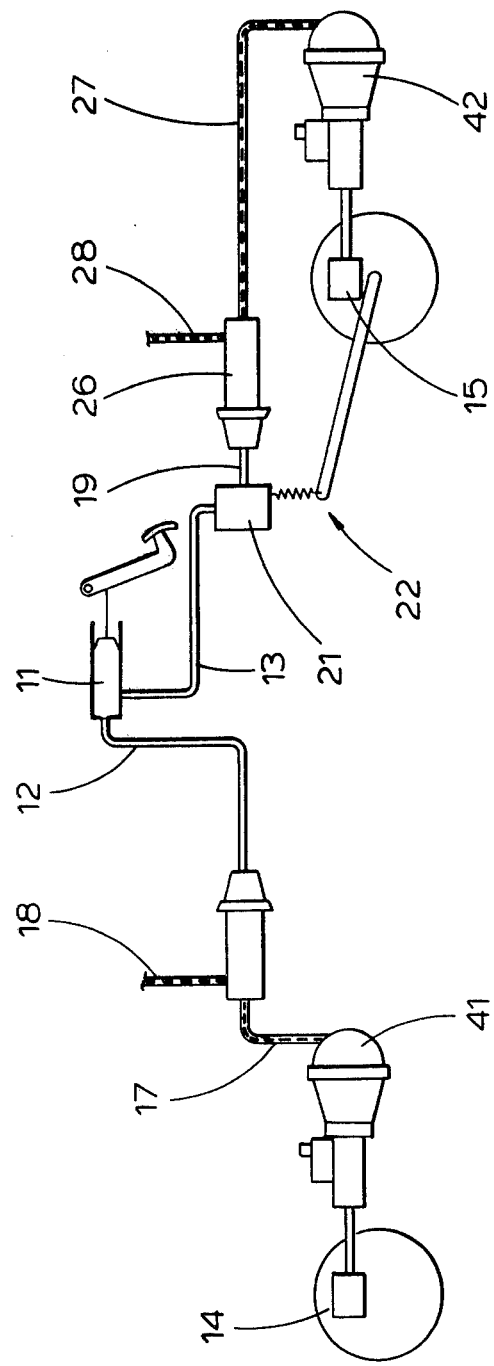
FIG. 3 is a schematic portion of a third brake system according to this invention.

Referring to FIG. 2 and FIG. 3, the same reference numerals will be used as for FIG. 1 for those components that are common to all three figures.

The brake system shown in FIG. 2 is identical with that shown in FIG. 1 except that the load sensitive reducing valve 21 has been replaced by a failure sensitive reducing valve 121 which is connected by hydraulic pipe 122 to the front brake system and which works in a manner known per se such that if a pressure failure occurs in the front brake system the fall in pressure in the line 12 is sensed by the valve 121 which then is caused not to reduce the pressure in the line 19 to the rear brakes, by as great an amount as previously.

With reference to FIG. 3, the braking system as shown is similar to that in FIG. 1, excepting that the air pipes 17 and 27 for the front and rear brake sets respectively are each connected to an air operated hydraulic master cylinder 41 and 42 respectively. Each master cylinder then operates the front or rear brake sets 14 and 15 through hydraulic means. The hydraulic pressure generated by the actuators is proportional to the air pressure given by the air control valves 16 and 26. Thus the pressure reducing valve 21 is interposed between the master cylinder 11 and the rear brake air control valve 26 works in the manner described for FIG. 1.

We claim:

1. An air powered braking system for a vehicle and comprising;
   a front wheel air powered brake system;
   a rear wheel air powered brake system;
   a pair of air pressure valves each of which regulates the air pressure in its respective one of the front or rear brake systems, said air valves being hydraulically controlled so that the air pressure in each of said front and rear systems is proportional to the hydraulic pressure;
   a hydraulic master cylinder operable by the vehicle driver and independently connected to each of air valves so as to generate said hydraulic pressure;
   and a pressure reducing valve interposed in the connection between the master cylinder and the rear brake system air valve so that on operation of the reducing valve to reduce the hydraulic pressure to that air valve the air pressure in the rear brake system relative to that in the front brake system is also reduced.

2. A braking system as claimed in claim 1, wherein the pressure reducing valve is a load sensitive pressure reducing valve and is arranged to sense the loads on the rear axle of the vehicle.

3. A braking system as claimed in claim 1, wherein the pressure reducing valve is a failure sensitive reducing valve that senses a fall in hydraulic pressure in the hydraulic connection to the front brake system, so that the reducing valve is caused not to reduce the hydraulic pressure to the rear brake system.

4. A braking system as claimed in claim 1, claim 2 or claim 3, wherein the air pressure in each of the front and rear brake systems is utilised for operating air operated hydraulic master cylinders fitted to the vehicle brakes.

* * * * *